(12) United States Patent
Dix et al.

(10) Patent No.: US 8,986,162 B2
(45) Date of Patent: Mar. 24, 2015

(54) SHUTTLE SHIFTING FOR A CONTINUOUSLY VARIABLE TRANSMISSION

(75) Inventors: Peter J. Dix, Naperville, IL (US); Garth H. Bulgrien, Ephrata, PA (US); Brian A. Hartman, Valparaiso, IN (US); Robert C. Prasse, Chicago, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/239,996

(22) PCT Filed: Aug. 27, 2012

(86) PCT No.: PCT/US2012/052565
§ 371 (c)(1),
(2), (4) Date: Feb. 20, 2014

(87) PCT Pub. No.: WO2013/029052
PCT Pub. Date: Feb. 28, 2013

(65) Prior Publication Data
US 2014/0206502 A1    Jul. 24, 2014

Related U.S. Application Data

(60) Provisional application No. 61/527,455, filed on Aug. 25, 2011.

(51) Int. Cl.
| | |
|---|---|
| *F16H 61/40* | (2010.01) |
| *F16H 41/24* | (2006.01) |
| *B60W 10/103* | (2012.01) |
| *B60W 30/18* | (2012.01) |
| *B60W 30/186* | (2012.01) |
| *F16H 61/66* | (2006.01) |
| *F16H 47/04* | (2006.01) |
| *B60W 10/04* | (2006.01) |
| *B60W 10/101* | (2012.01) |

(Continued)

(52) U.S. Cl.
CPC ............. *F16H 41/24* (2013.01); *B60W 10/103* (2013.01); *B60W 30/18045* (2013.01); *B60W 30/186* (2013.01); *F16H 61/66* (2013.01); *F16H 47/04* (2013.01); *B60W 10/04* (2013.01); *B60W 10/101* (2013.01); *B60W 2510/0241* (2013.01); *F16H 2037/0886* (2013.01); *F16H 2059/088* (2013.01); *F16H 2061/6608* (2013.01); *B60W 2510/10* (2013.01)
USPC .......................................................... 477/68

(58) Field of Classification Search
None
See application file for complete search history.

(56) References Cited

U.S. PATENT DOCUMENTS

| | | |
|---|---|---|
| 2,097,436 A | 11/1937 | Bennetch |
| 3,810,531 A | 5/1974 | Edmunds |
| 4,055,047 A | 10/1977 | Hara |

(Continued)

*Primary Examiner* — Dirk Wright
(74) *Attorney, Agent, or Firm* — Sue C. Watson (57) ABSTRACT

A shuttle shifting method for a continuously variable transmission automatically selects a manner of shuttle shifting as a function of certain monitored conditions. As one alternative, the direction of operation of the transmission is changed prior to reducing the vehicle speed to zero, and tilt of a swash plate of the hydrostatic power unit of the transmission is held substantially constant, for achieving fast, smooth shifts at faster starting and ending vehicle speeds, without coming to a complete stop. In another alternative, for slower starting and ending speeds, or other conditions such as a temperature condition is present, the vehicle is stopped by changing swash plate angle before effecting a directional change of the transmission and the swash plate.

21 Claims, 9 Drawing Sheets (51) Int. Cl.
*F16H 37/08* (2006.01)
*F16H 59/08* (2006.01)

(56) References Cited

U.S. PATENT DOCUMENTS

| | | | |
|---|---|---|---|
| 4,102,222 A | 7/1978 | Miller et al. | |
| 4,167,855 A | 9/1979 | Knapp | |
| 4,310,078 A | 1/1982 | Shore | |
| 4,489,552 A | 12/1984 | Watanabe et al. | |
| 4,530,416 A | 7/1985 | Kassai | |
| 4,543,786 A | 10/1985 | Shuler | |
| 4,653,350 A | 3/1987 | Downs et al. | |
| 4,759,185 A | 7/1988 | McConnell et al. | |
| 4,811,225 A | 3/1989 | Petzold et al. | |
| 5,184,466 A | 2/1993 | Schniederjan et al. | |
| 5,406,793 A | 4/1995 | Maruyama et al. | |
| 5,449,329 A | 9/1995 | Brandon et al. | |
| 5,467,854 A | 11/1995 | Creger et al. | |
| 5,468,198 A | 11/1995 | Holbrook et al. | |
| 5,531,304 A | 7/1996 | Ishino et al. | |
| 5,540,051 A | 7/1996 | Maruyama et al. | |
| 5,573,473 A | 11/1996 | Asayama et al. | |
| 5,580,332 A | 12/1996 | Mitchell et al. | |
| 5,671,137 A | 9/1997 | Ishino et al. | |
| 5,684,694 A | 11/1997 | Ishino et al. | |
| 5,980,411 A | 11/1999 | Wontner | |
| 6,080,074 A | 6/2000 | Ulbrich et al. | |
| 6,088,645 A | 7/2000 | Kawasaki et al. | |
| 6,115,661 A | 9/2000 | Hosseini et al. | |
| 6,250,077 B1 | 6/2001 | Iino et al. | |
| 6,285,942 B1 | 9/2001 | Steinmetz et al. | |
| 6,292,732 B1 | 9/2001 | Steinmetz et al. | |
| 6,295,497 B1 | 9/2001 | Kuras | |
| 6,332,860 B1 | 12/2001 | Hubbard et al. | |
| 6,442,934 B1 | 9/2002 | Okuda et al. | |
| 6,481,314 B2 | 11/2002 | Nemoto et al. | |
| 6,524,205 B1 | 2/2003 | Irikura et al. | |
| 6,616,559 B1 | 9/2003 | Hori et al. | |
| 6,672,990 B2 | 1/2004 | Netzer | |
| 6,832,978 B2 | 12/2004 | Buchanan et al. | |
| 7,037,236 B2 | 5/2006 | Ishibashi et al. | |
| 7,063,638 B2 | 6/2006 | Weeramantry | |
| 7,082,757 B2 | 8/2006 | Teslak et al. | |
| 7,147,239 B2 | 12/2006 | Teslak et al. | |
| 7,278,953 B2 | 10/2007 | Meyer et al. | |
| 7,549,287 B2 | 6/2009 | Foster et al. | |
| 2008/0139363 A1 | 6/2008 | Williams | |
| 2008/0242464 A1 | 10/2008 | Kumazaki et al. | |
| 2014/0221155 A1* | 8/2014 | Petrigliano et al. | 477/68 |
| 2014/0222304 A1* | 8/2014 | Dix et al. | 701/60 |

\* cited by examiner

SHUTTLE SHIFTING FOR A CONTINUOUSLY VARIABLE TRANSMISSION

This application claims the benefit of U.S. Provisional Application No. 61/527,455, filed Aug. 25, 2011.

TECHNICAL FIELD

The present invention relates generally to shuttle shifting a continuously variable transmission, and more particularly, to a method that automatically selects a manner of shuttle shifting from several alternatives as a function of certain monitored conditions or parameters, which can include, but is not limited to, one or more speeds, and temperature of one or more elements of the transmission and/or related apparatus. As a result, fast, smooth shifting at faster starting and ending vehicle speeds, without coming to a complete stop, is achieved.

BACKGROUND ART

The disclosure of U.S. Provisional Application No. 61/527,455, filed Aug. 25, 2011, is hereby incorporated herein in its entirety by reference.

Continuously variable transmissions utilizing a hydrostatic power unit, hereinafter sometimes referred to as hydro-mechanical continuously variable transmissions, are well known. A variety of work machines utilize this type of transmission for industries such as agriculture, earth moving, construction, forestry, and mining. In operation, the fluid displacement of the hydrostatic power unit is varied to change the output to input ratio of the transmission, that is, the ratio between the rotating output of the transmission, and the input. This is accomplished by varying the angle in a swash plate of a variable displacement fluid pump or motor of the hydrostatic unit. In a common mode of operation referred to as a shuttle shift, the direction of movement of the machine is changed, often under load, a common example of which being when a tractor loader moves in one direction to pick or scoop up a load, then lifts the load and reverses direction, often involving a turning movement, and unloads the load. This sequence is then reversed, and is often repeated many times. Sometimes, such shuttle shifting operations are performed on slopes or inclines. Such movements tend to subject elements of the transmission to wear and tear, and can raise the temperature of various elements, particularly clutches, and thus raise performance, longevity and reliability concerns. It is also typically desired for shuttle shifts to be completed relatively quickly and seamlessly, with little or no jerking or lurching of the machine.

In one category of the transmissions, the hydrostatic power unit is configured such that to effect movement of the vehicle in one direction, a swash plate of the unit will be tilted in one direction. To effect vehicle movement in the opposite direction, the swash plate is tilted in the opposite direction. When no vehicle movement is sought, e.g., no forward or rearward motion, the swash plate of the unit is moved to a zero tilt angle or near zero angle. Then, to effect movement of the vehicle in one direction or the other, the swash plate is appropriately tilted in the requisite direction to the requisite angle. In this category of transmission, if multiple speed ranges are provided, zero speed for each range will be the zero or near zero position, which presents no problem or limitation for shuttle shifting to move the vehicle in opposite directions.

However, another category of continuously variable transmissions, commonly used in a variety of heavy vehicles such as work machines, including for construction, earth moving, forestry, and agriculture, wherein shuttle shifting commonly used, employs a hydrostatic power unit configured such that at zero vehicle or machine speed, the swash plate of the hydrostatic power unit is at full displacement or near full displacement, in one direction or the other, depending on the range selected, direction of travel and possibly other factors. Reference as an example in this regard, Weeramantry, U.S. Pat. No. 7,063,638 B2, issued Jun. 20, 2006. When shuttle shifting this type of transmission, the common practice is to reduce the gear ratio to achieve zero vehicle speed, and then shift the transmission to move the machine in the opposite direction. When zero vehicle speed is reached, some time will be required to move the swash plate to its new position, and during this time the operator can apply a brake or engage a combination of opposing clutches to hold the wheels or tracks. However, a shortcoming of this manner of shifting is that a delay can result as the swash plate is moved. As another possible shortcoming, repeatedly performing shuttle shifts in the same manner can raise temperature related performance and reliability issues, particularly if the brake is repeatedly used to decelerate the vehicle or the same clutch is repeatedly used to decelerate and/or accelerate the vehicle during the shifts. Additionally, not all shuttle shifts are performed under the same conditions, and it can be desirable to have alternative manners of performing a shuttle shift for the different conditions.

Thus, what is sought is a manner of overcoming one or more of the disadvantages or shortcomings, and achieving one or more of the desired characteristics, set forth above.

SUMMARY OF THE INVENTION

What is disclosed is a method of shuttle shifting a continuously variable transmission which overcomes one or more of the disadvantages or shortcomings, and achieves one or more of the desired characteristics, set forth above.

According to a preferred aspect of the invention, fast, smooth shifts at faster starting and ending vehicle speeds, can be achieved, without coming to a complete stop. According to another preferred aspect of the invention, the need for the operator to use the service brakes to hold the vehicle from rolling on hills is reduced or eliminated.

According to another preferred aspect of the invention, at least two manners of performing a shuttle shift are provided, and a manner of performing a shuttle shift for particular conditions is automatically selected from the alternatives, as a function of one or more certain monitored conditions or parameters. Representative conditions or parameters can include, but are not limited to, a start speed and end speed of the shift. Another condition can be the temperature of one or more elements of the transmission, such as, but not limited to, elements for holding the vehicle during aspects of the shift, such as a clutch or clutches, and a parking brake of the transmission. In this latter regard, another aspect of the invention is a proportional parking brake that can be applied and released gradually, as will be explained.

One of the automatically selectable manners of shuttle shifting, to be utilized, for instance, when the starting and ending vehicle speeds are both low, involves reducing vehicle speed in the first direction in the conventional manner using ratio control. As the speed approaches zero, the parking brake will be automatically gradually applied to hold the output speed at zero, e.g. if the vehicle is on a hill, and the off-going directional clutch and the range clutch are automatically disengaged, e.g. dumped. The range clutch is dumped so that any reaction torque caused by moving the swash plate will not add to the torque at the parking brake, which could cause it to slip, allowing the vehicle to move. The swash plate is then moved toward the target position for the new direction. As the swash plate is moved, the on-coming directional clutch is also engaged, providing input to the planetary so that its output will approach zero speed. The applied pressure of the parking brake should be high enough to keep the vehicle from moving, even on a steep hill. Then, after the swash plate is moved to the correct position and the on-coming directional clutch is filled, the parking brake will be released or disengaged and the range clutch will be reengaged and the vehicle will begin to move as the swashplate is moved to control the rate of acceleration. As an advantage, the automatic application and release of the parking brake eliminates need for the operator to apply the service brake for holding the vehicle from rolling either up or down hill while the swash plate is moved. This is done while the swash plate is moving, and then the parking brake is smoothly disengaged while engaging the on-coming clutch to prevent any rolling.

In another manner of automatically shuttle shifting, it is preferred to do direction swaps at a time when little swash plate movement will be required or the swash plate angle is constant during the swap, and is referred to as a constant swash plate angle or constant SPA shuttle shift. This manner of shuttle shift can be executed, for instance, for high speed to high speed shuttle shifts. For this shift, first the speed is reduced by moving the swash plate to reduce the transmission ratio. If the shuttle shift is commanded from a higher speed range, the swash plate will be moved and the range shifts will occur just as they do in normal speed changes. Next, when the transmission ratio is at a given point, the directional clutches will be swapped, and the swash plate moved to a value for a particular transmission ratio in the opposite direction. The oncoming directional clutch is filled in anticipation of this point. This transmission ratio value for the opposite direction is less than the final value, to limit the energy dissipated. This swap may be initiated such that the swash plate either continues in the same direction slightly, is held constant during the swap, or actually reverses direction during the swap, depending on the relative values of the various parameters. Reversing the direction of the swash plate during the swap can result in less energy being dissipated in the clutch, which is desirable, but if the swash plate control is sluggish compared with the time needed for the swap, it may be better to have some movement of the swash plate in the same direction during the swap. Also, and perhaps more importantly, moving the swash plate during the swap creates a reaction torque that affects the deceleration, so consistent decelerations are easier to achieve if the swash plate movement is minimized. Here, it should be mentioned that the term "transmission ratio" is defined for the purposes of the description here and the invention, as the speed ratio across the transmission, also referred to sometimes as "TRR" and is calculated as transmission output speed/input speed.

As an advantage of the invention, because different manners of shuttle shifting are provided, shuttle shifts can be performed from any forward speed to any reverse speed. For desired control, both the speed when the shuttle is commanded (or the current speed) and the final opposite speed will need to be determined, to enable the transmission controller to determine how and when to swap the clutches and move the swash plate. As another advantage of the invention, shuttle shifts between different vehicle speeds can be accomplished. As still another advantage of the invention, operating parameters of the transmission and other components can be monitored and used as factors in determining the manner of shuttle shifting to be used. As a non-limiting example, temperatures of the directional clutches, range clutches or parking brake can be monitored and/or modeled, and if too hot, a manner of shifting selected that does not involve, or minimally involves, the affected component. This can be utilized both at the initial selection of a manner of shifting, and during the shift in the event that a component, e.g., clutch or parking brake, is in danger of overheating, for instance, as a result of the vehicle overspeeding down a hill during an attempted shift.

As an advantage of the invention, during shuttle shifts, slip in the directional clutches of the transmission is controlled to achieve desired deceleration and acceleration, rather than using the swash plate, so that speed of the shifts is increased.

DETAILED DESCRIPTION OF THE INVENTION

Figure 1:
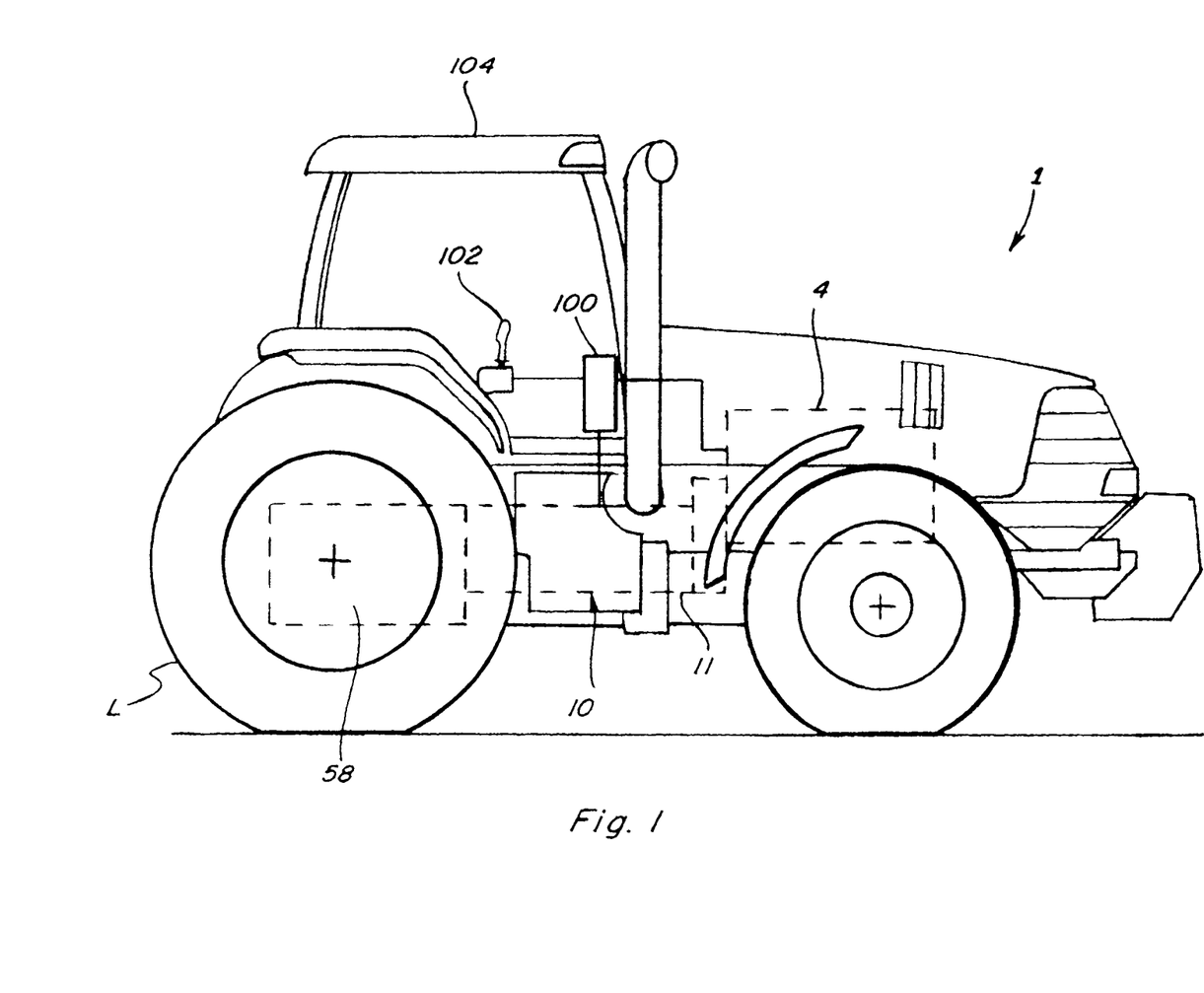
FIG. 1 is a side view of a representative work machine including a continuously variable hydro-mechanical transmission automatically controllable according to the invention for selecting from alternative manners of shuttle shifting and executing the selected shift.

Referring now to the drawings, in FIG. 1 a representative vehicle which is a work machine 1 is shown, which is a tractor representative of those that can be used for a variety of uses, including, but not limited to, agriculture, construction, earth moving and forestry. Work machine 1 includes a power source 4 which will be, for instance, an internal combustion engine, and is mechanically coupled to a continuously variable hydro-mechanical transmission, a representative embodiment 10 of which is shown schematically in FIG. 2. Transmission 10 is automatically operable for selecting from several alternative manners of performing shuttle shifts as a function of one or more monitored conditions, and executing the selected shuttle shift according to the invention, as will be explained.

Figure 2:
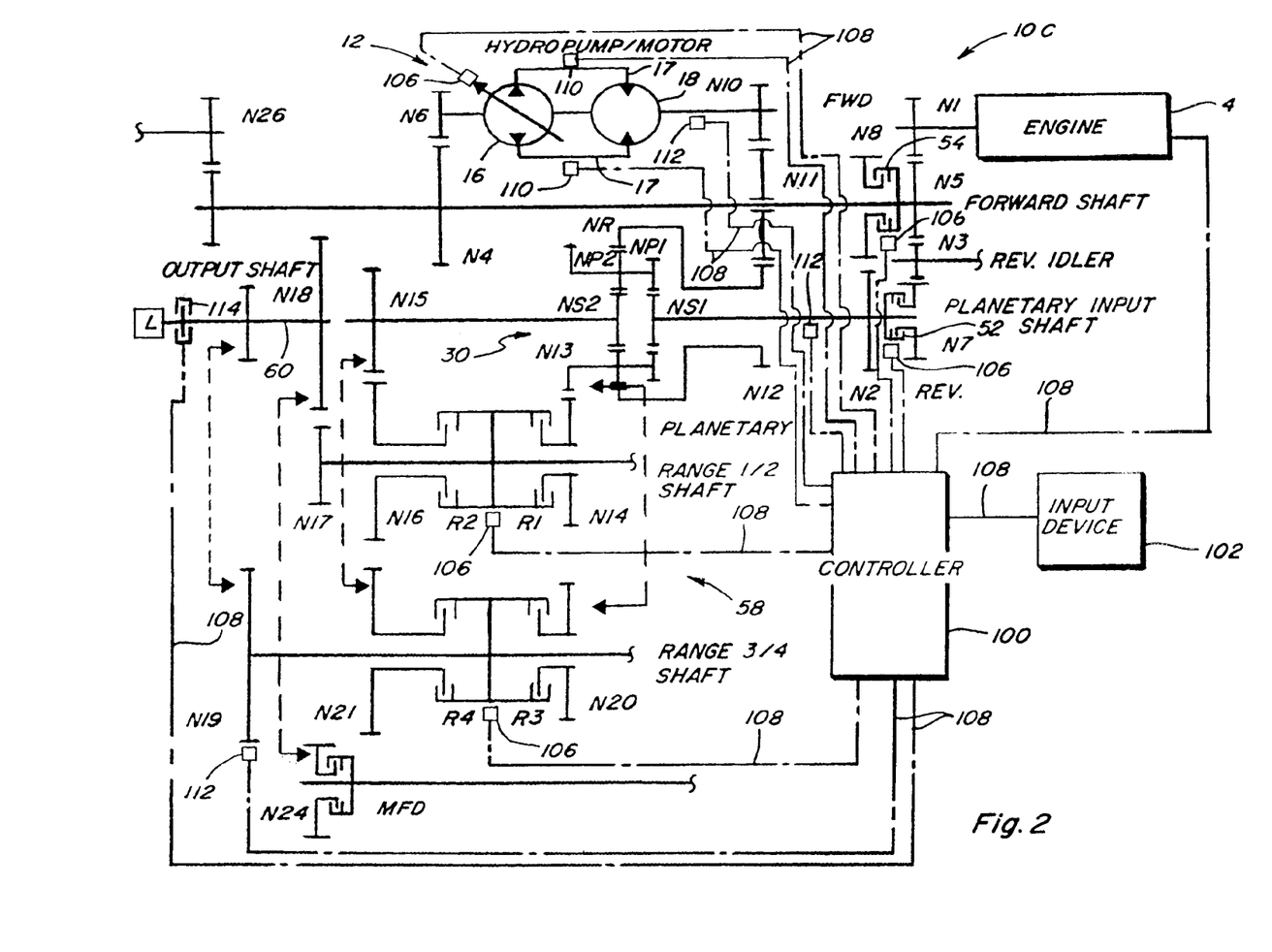
FIG. 2 is a simplified schematic representation of the hydro-mechanical transmission of the work machine of FIG. 1.

Referring also to FIG. 2, transmission 10 is contained in a transmission housing 11 and includes a hydrostatic power unit 12 and a planetary power unit 30 which are coupled to a driveline including a range gear set 58 mounted within transmission housing 11 and coupled to a load L which here is the drive wheels of machine 1 as shown in FIG. 1. It should be understood that machine 1 can alternatively include a load L that comprises a track drive, or an operating system of the machine such as but not limited to, a power take off (PTO).

Hydrostatic power unit 12 of transmission 10 includes a fluid pump 16 coupled by fluid conduits 17 in a closed loop to a fluid motor 18. Motor 18 is coupled to power source 4 via an input gear N6 and having an output gear N10. The power to the hydrostatic power unit 12 is provided by a driven gear N4 mounted on the forward shaft and engaged with gear N6. Output gear N10 is connected to ring gear NR of planetary power unit 30 via gears N11 and N12.

Machine 1 includes a processor based controller 100 in connection with an input device 102 located preferably in operator cab 104 of machine 1, via a suitable communications path 108, to adjust the angle of a swash plate of pump 16 (swash plate denoted by a diagonal arrow through pump 16), through a range of positions. As an exemplary embodiment, pump 16 can be an electronically controlled variable displacement hydraulic pump of well known construction.

Planetary power unit 30 includes a primary sun gear NS1 on a planetary input shaft 32 connectable with power source 4 via a forward directional clutch 54 or a reverse directional clutch 52. Power unit 30 is selectively coupled to the load L, coupled to the hydrostatic power unit 12 and selectively coupled to the power source 4, under automatic control of controller 100. For connection to the load L, the hydro-mechanical transmission 10 includes an output shaft 60 coupled to the load L which carries an input gear N18 engaged with an output gear N17 on a range ½ shaft of range gear set 58, and a gear N22 engaged with a gear N19 on a range ¾ shaft. The range ½ shaft can be coupled to planetary power unit 30 via automatic operation of range selectors or clutches R1 and R2 for power flow through gears N13 and N14, or N15 and N16, respectively. The range ¾ shaft can be coupled to unit 30 via range selectors or clutches R3 and R4 for power flow via gears N13 and N20, or N15 and N21. Range ½ shaft and range ¾ shaft can also be simultaneously coupled to power unit 30, to provide dual power flow.

The control of the various clutches will be automatically controlled by controller 100, using actuators 106 connected to controller 100 via suitable conductive paths 108. Transmission 10 also includes appropriate sensors, including pressure sensors 110 for sensing pressure conditions in conduits 17 connecting pump 16 and motor 18, and speed sensors 112 for sensing speeds of load shaft 60, all connected to controller 100 via conductive paths 108. Controller 100 is also connected to engine 4 for receiving speed and other information therefrom.

In operation, the continuously variable hydro-mechanical transmission 10 can be operated to have a combined hydrostatic and mechanical power flow by engaging the reverse clutch 52 to power planetary power unit 30 via gears N1, N3, N5 and N7, or engaging forward clutch 54 to power it via gears N1, N8, and N2. It is also possible to operate transmission 10 for a pure hydrostatic power flow by disengaging both clutches 52 and 54.

As a result, with transmission 10, there is no selection for a work range or road range per se. However, the transmission provide a seamless transition between ranges to provide work/road configurations as desired. Speed change from zero to maximum speed is achieved in a smooth and continuous manner by changing the swash plate angle of the pump 16 under control of controller 100. For each speed range, substantially the full range of travel of the swash plate is used. That is, the swash plate will be at one end of the range its travel for zero speed within the range, it will be at the other end for maximum speed in that range, and the zero tilt or neutral position of the swash plate will be an intermediate position for the speed range, not the zero speed position as it is for some other transmissions. This presents a challenge for execution of some transmission commands that require a change of state wherein the swash plate will have to be tilted to a position significantly different from the present position, e.g., some shuttle shifts, as some time for the transition or movement to the new position will be required. For other commands, e.g., shuttle shifts at higher speeds, the speed range will need to be changed, but it can be observed that the required ending swash plate position is the same or similar to the beginning position, which presents an opportunity for shifting in a different manner than that for lower speed shifts.

Transmission 10 includes a parking brake 114 in connection with load shaft 60, which is utilized according to the invention for enabling at least one selectable manner of shuttle shifts. Parking brake 114 is connected to controller 100 via a suitable conductive path 108 for automatic operative control thereby, including to proportionally or gradually engage, and release or disengage, under certain conditions. To achieve this latter capability, as a non-limiting example, parking brake 114 can be controlled using a proportional pressure reducing valve operated by an electrical signal from controller 100. For operation when machine 1 is not operating, parking brake 114 can be engaged by a spring or other biasing element or elements, or by mechanical means.

Other conditions wherein parking brake 114 will be automatically controlled by controller 100 to engage, or remain engaged if already engaged, can include, but are not limited to, when power source 4 of machine 1 is turned off, the transmission is disengaged, the operator leaves the operator seat, and if the FNR lever is left in F for a certain period of time without movement. Controller 100 will also control the parking brake to remain engaged when a command is received to disengage the parking brake, until certain conditions are met, as will be explained. Other conditions include when a command is received via an input device 102, e.g., FNR lever or the like, to change the operating state of the transmission. Such commands can include a change to, or in close proximity to, a neutral or zero movement state, or a clutch command.

Figure 3:
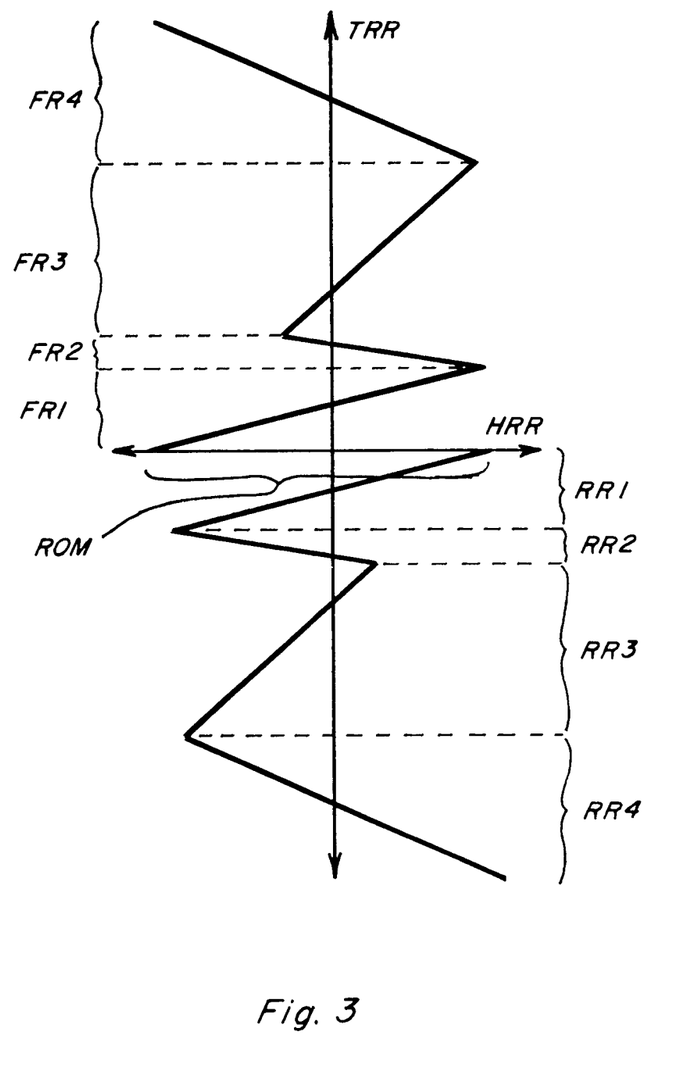
FIG. 3 is a simplified diagrammatic representation of transmission ratio verses hydrostatic power unit ratio for the transmission of FIG. 2.

Referring also to FIG. 3, a graphical representation of the relationship of transmission ratio, denoted TRR, to hydrostatic power unit ratio (motor speed/pump speed) denoted HRR, is shown, for the four selectable forward ranges, and four selectable reverse ranges of operation of transmission 10: namely, forward range 1 or low (denoted FR1); forward range 2 (denoted FR2); forward range (FR3); forward range (FR4); reverse range 1 (RR1); reverse range 2 (RR2); reverse range 3 (RR3); and reverse range 4 (RR4). HRR directly relates to swash plate angle, which is the parameter controlled by controller 100. In FIG. 3, it should be noted that for each of the ranges, the zero tilt position of the swash plate lies between the maximum degrees of tilt in the opposite directions of movement of the swash plate. Thus, at the lowest hydrostatic power unit ratio for forward range RR1, the swash plate will be at or near maximum tilt in the left hand direction as depicted, which is also the zero speed ratio for the transmission for that direction, while at the highest ratio for that range the swash plate will be at or near its maximum tilt in the opposite direction, which is the right hand direction as depicted. It can be noted that for the reverse direction, the opposite is true. Thus, it can also be observed that to go from zero speed in the lowest range in the forward direction to zero speed in the lowest range in the reverse direction, the swash plate must travel substantially its entire range of movement, as depicted by distance ROM. It should also be noted that to engage reverse, not only must the forward and reverse directional clutches 54 and 52 be swapped, but the swash plate must be moved the distance ROM. Here, it should be noted that when referring to the term "maximum" tilt, some marginal amount of swash plate movement should still remain such that zero vehicle speed can still be achieved under conditions such as, but not limited to, leakage in the hydrostatic power unit, that may cause the motor to rotate more slowly for a given swash plate angle.

Additionally, while the swash plate is being moved from one side to the other, generally the driveline cannot be engaged, since this could result in higher speeds if the clutch is not slipped. There are perhaps two main options to deal with this, one is to four square the transmission (lock the output shaft) by applying both the R1 and R3 clutches, and the second is to use the parking brake. If four squaring is used, it is difficult to control, since the swash plate movement is not completely decoupled, and moving the swash plate tends to move the vehicle in the opposite direction, and this must be compensated for by controlling the pressure in either the R3 or R1 clutches.

As an advantage of the present invention, shuttle shifting shall be allowed from any forward speed to any reverse speed. According to the invention, shuttle shifts will have three phases. During the first, machine 1 is decelerated using the swash plate, with the deceleration limited to a target value. Next, the forward and reverse clutches 54, 52 are swapped. Directional swapping is defined as the part of the shuttle shift from when the off-going directional clutch starts to dump to when the on-going clutch is finished ramping up and is fully engaged. The last phase of a shuttle is when the machine may be accelerated using the swash plate to the final speed in the opposite direction. This is done with the swash plate, range shifting as needed, and limited to the desired transmission acceleration value. It should also be noted that deceleration is controlled in all phases of all types of shuttles, during the ratio changing, deceleration with the parking brake, and deceleration then reacceleration using clutch slipping.

As a consideration, it is advisable to minimize energy dissipated by clutches to prevent damage. It has been found that one of the best ways to do this is to reduce the speed of the vehicle prior to the shift. Directional swapping is always done in the first range. If the speed is higher when the shuttle shift is commanded, the vehicle will be slowed by normal swash plate movement and range shifting. As a result, in the invention, both the speed when the shuttle is commanded (or the current speed) and the final opposite speed will be needed to determine when and how to swap the clutches and move the swash plate.

As another consideration, as evidenced by the distance ROM, shuttle shifting for transmissions such as transmission 10 is challenging because the swash plate may need to move a considerable distance before the oncoming clutch can be engaged, or the vehicle may go too fast before the swash plate reaches its final position. In this case, it has been found that it is best to apply parking brake 114, to keep the vehicle from rolling while in neutral when the swash plate is being moved. As another consideration, since the time to move the swash plate may vary considerably, and engaging the on-coming clutch while the swash plate is not in position can cause overspeed conditions, controller 100 should fill the oncoming clutch, and then wait until the motor speed (swash plate error) has reached it proper value before engaging the on-coming clutch, to achieve consistent shifts. During shuttle shifts, the desired transmission output acceleration (DTOA) is desirably achieved through all phases, and especially needs to be matched during transitions between phases. The pressure in the on-coming clutch should be carefully controlled to achieve the correct DTOA, both through initialization to the proper pressure and closed loop control. If the parking brake is used for decelerations, it is also controlled in a closed loop fashion to achieve DTOA.

Figure 4:
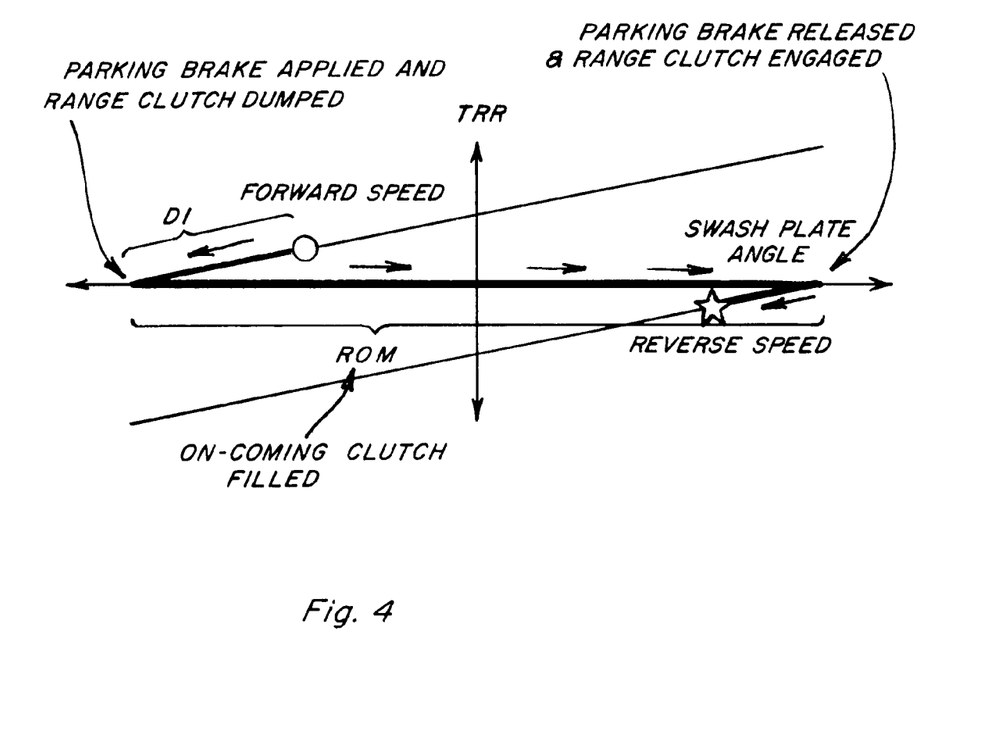
FIG. 4 is a simplified diagrammatic representation of the transmission ratio verses hydrostatic power unit swash plate angle for the transmission of FIG. 2, for one of the selectable manners of shifting the transmission.

Referring also to FIGS. 4 through 9, several manners of shuttle shifting, for different respective conditions, will be explained. In these FIGURES, the vertical axis represents the ratio of the transmission output speed to the engine speed, denoted TRR, and is also representative of the vehicle speed of movement in opposite directions (forward above horizontal axis; reverse below). The horizontal axis represents the swash plate angle of the hydrostatic power unit. In the graphs a forward to reverse shuttle shift is depicted, but the description will also apply to a reverse to forward shuttle shift for the applicable conditions. In this regard, FIG. 4 depicts a manner of shuttle shifting for a low forward beginning speed, and a low reverse ending speed. This utilizes automatic operation of the parking brake just as the vehicle is brought down to zero speed and the range clutch is dumped.

As a first step, the speed is reduced by moving the swash plate, as denoted by distance D1. In FIG. 4, range shifts are not shown, but if the shuttle shift is commanded from a higher speed range, then the swash plate will be moved and the range shifts will occur just as they do in normal speed changes. Just like normal speed changes, the rate of change of the desired transmission ratio may be limited and adjusted by control software of controller 100.

As the vehicle reaches zero speed, the range clutch is dumped, and parking brake 114 is automatically applied to reduce required operator action, e.g., clutching and application of the service brake, to prevent unwanted movements of the vehicle. The applied pressure of the parking brake should be high enough to keep the vehicle from moving in the wrong direction, even on a steep hill. The swash plate will then be moved over distance ROM to reverse tilt. During movement of the swash plate over distance ROM, the on-coming directional clutch is filled. Then, after the swash plate is moved to the correct position and the on-coming directional clutch is filled, the parking brake will be released or disengaged and the vehicle will begin to move. The swash plate is then moved if necessary in a manner to achieve the selected reverse speed.

Figure 5:
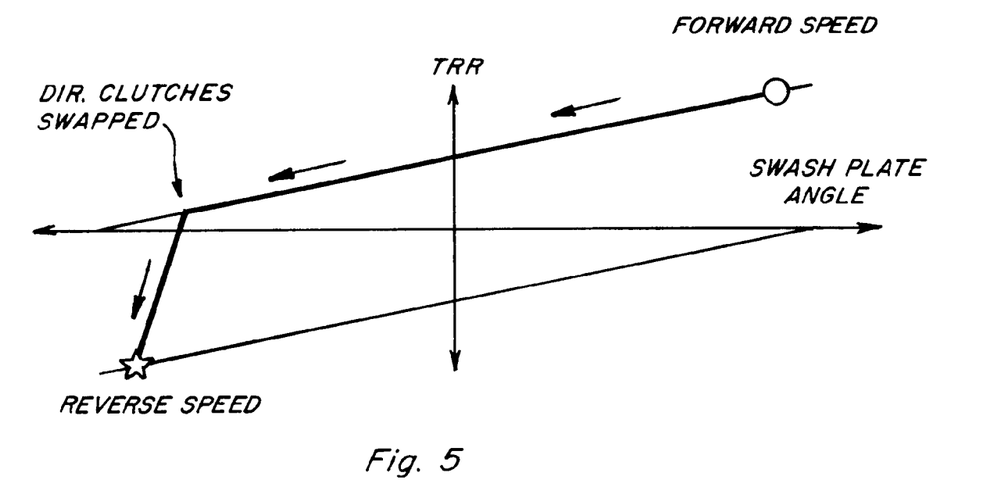
FIG. 5 is a simplified diagrammatic representation of the transmission ratio verses swash plate angle for the transmission of FIG. 2, for another selectable manner of shifting the transmission.
Figure 6:
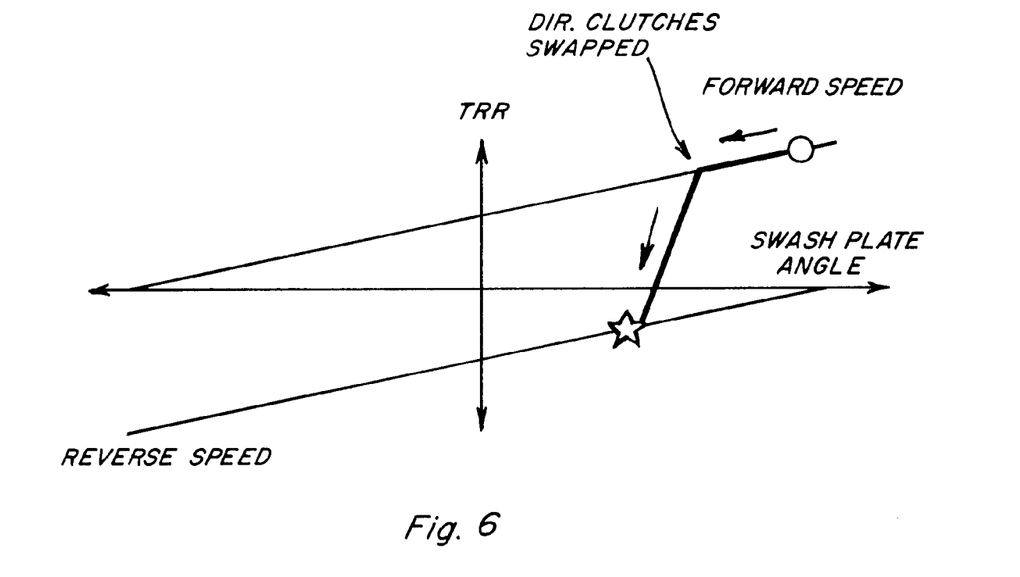
FIG. 6 is a simplified diagrammatic representation of the transmission ratio verses swash plate angle for the transmission of FIG. 2, for another selectable manner of shifting the transmission.

Another manner of shuttle shifting according to the invention is illustrated in FIG. 5 is a constant SPA shuttle shift. This manner is applicable for high speed to high speed shifts, and also high to low and low to high shifts (FIG. 6). Note that this manner of shuttle shift can be utilized at almost any swash plate angle, depending on the final reverse speeded needed. The energy will depend on the squared difference in the speed across the on-coming clutch as it engages. Changing the swash plate angle to slow the vehicle before performing the clutch swap will reduce the energy and probably result in better performance. The energy dissipated will be similar to the case of high speed to high speed shift. In FIG. 5, range shifts are not shown, but if the shuttle shift is commanded from a higher speed range, the swash plate will be moved and the range shifts will occur just as they do in normal speed changes.

Next, when the transmission ratio is at a given point, the directional clutches are swapped and the swash plate is moved to a value for a particular transmission ratio in the opposite direction. The oncoming directional clutch is filled in anticipation of this point. This swap may be initiated such that the swash plate angle either continues change in the same direction slightly, is held constant during the swap, or actually reverse direction during the swap, depending on the relative values of the various parameters. Again, reversing the direction of the swash plate angle during the swap can result in less energy being dissipated in the clutch, which is desirable, but if the swash plate control is sluggish compared with the time needed for the swap, it may be better to have some movement of the swash plate in the same direction during the swap. Also again, and perhaps more importantly, moving the swash plate during the swap creates a reaction torque that affects the deceleration, so consistent decelerations are easier to achieve if the swash plate movement is minimized.

FIG. 6 illustrates a high to low speed shuttle shift in the just described manner. This illustrates that shuttles that don't require the swash plate to move back in the opposite directional don't necessarily need to be high speed to high speed ones. The shift occurs at speeds higher than for the high to high speed shift, since the reverse speed is slower. Note that these types of shifts can occur at most any swash plate angle, depending on the final reverse speeded needed. The energy will depend on the squared difference in the speed across the on-coming clutch as it engages.

Medium speed shuttle shifts are ones where generally there is enough time to move the swash plate into position before the vehicle comes to a stop, although this may not always be the case. The proper time to switch between the shuttle shift strategy using the parking brake to decelerate described here and the shuttle shift using ratio control strategy described above can be determined by which feels better in testing.

Figure 7:
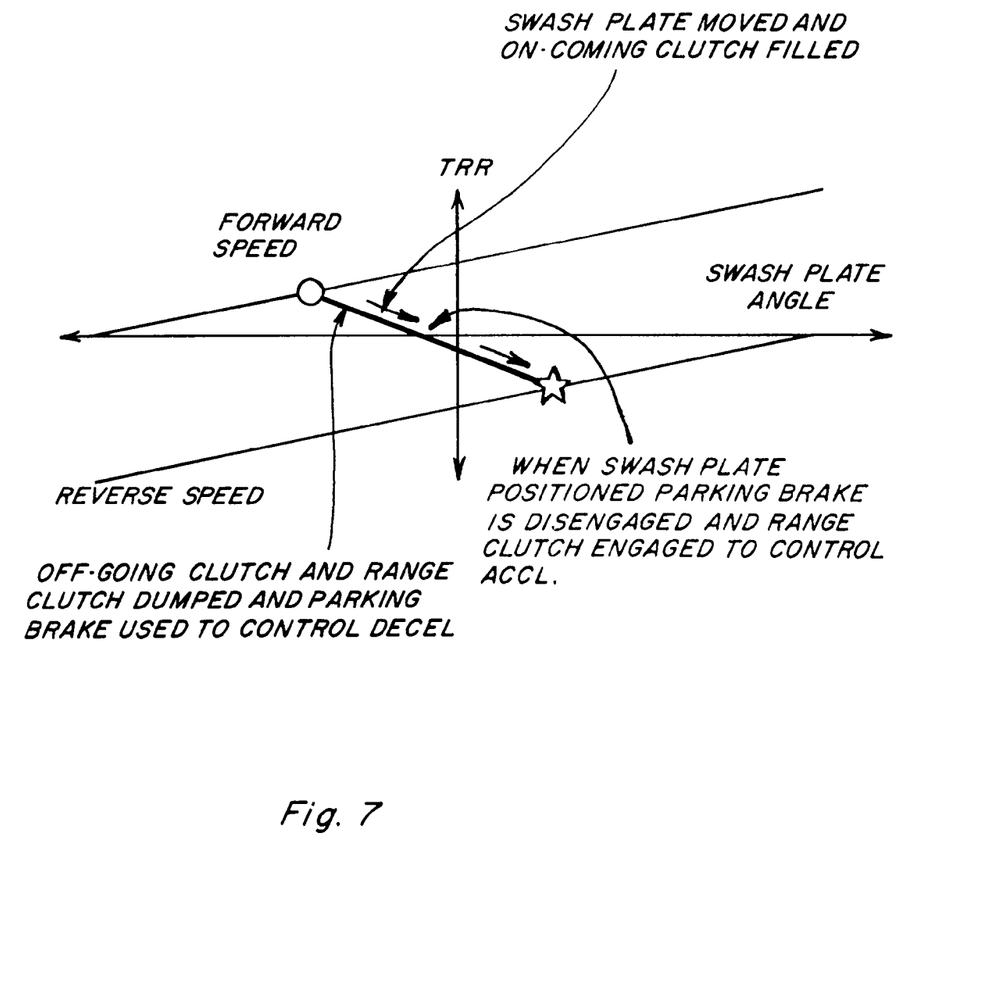
FIG. 7 is a simplified diagrammatic representation of the transmission ratio verses swash plate angle for the transmission of FIG. 2, for still another selectable manner of shifting the transmission.
Figure 8:
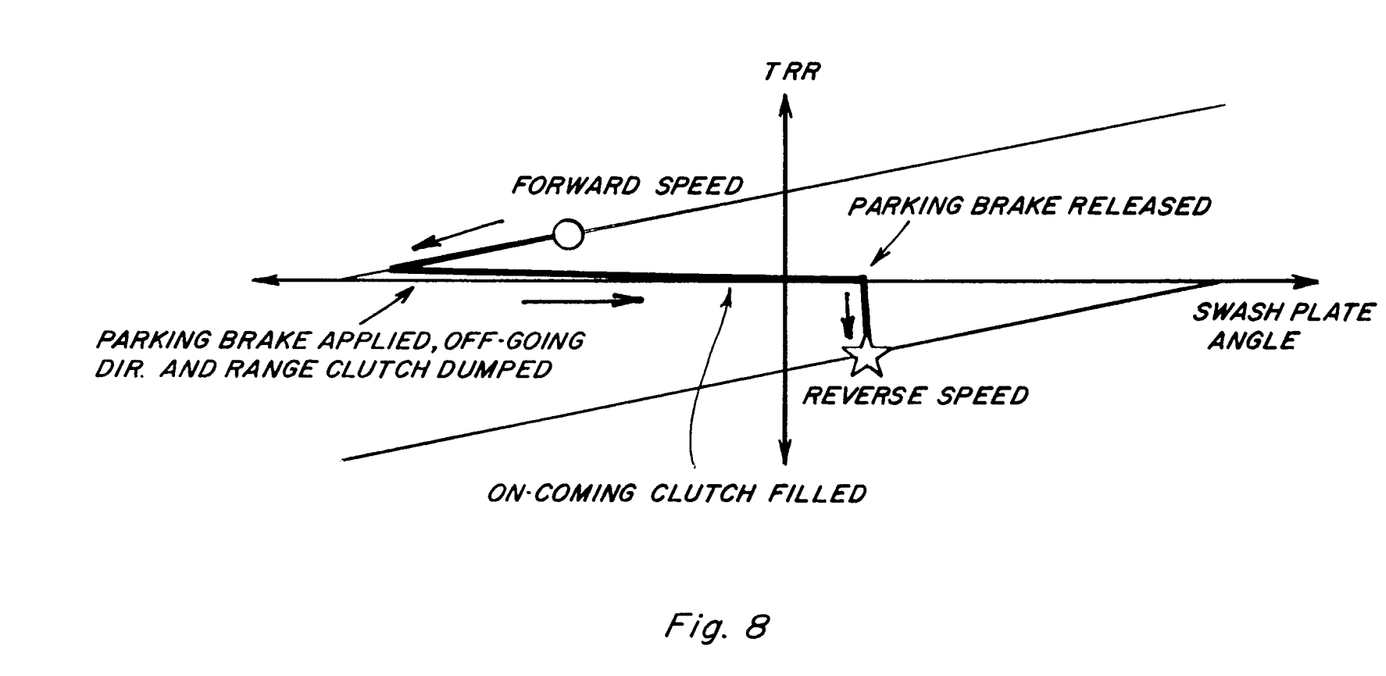
FIG. 8 is a simplified diagrammatic representation of the transmission ratio verses swash plate angle for the transmission of FIG. 2, for still another selectable manner of shifting the transmission.
Figure 9:
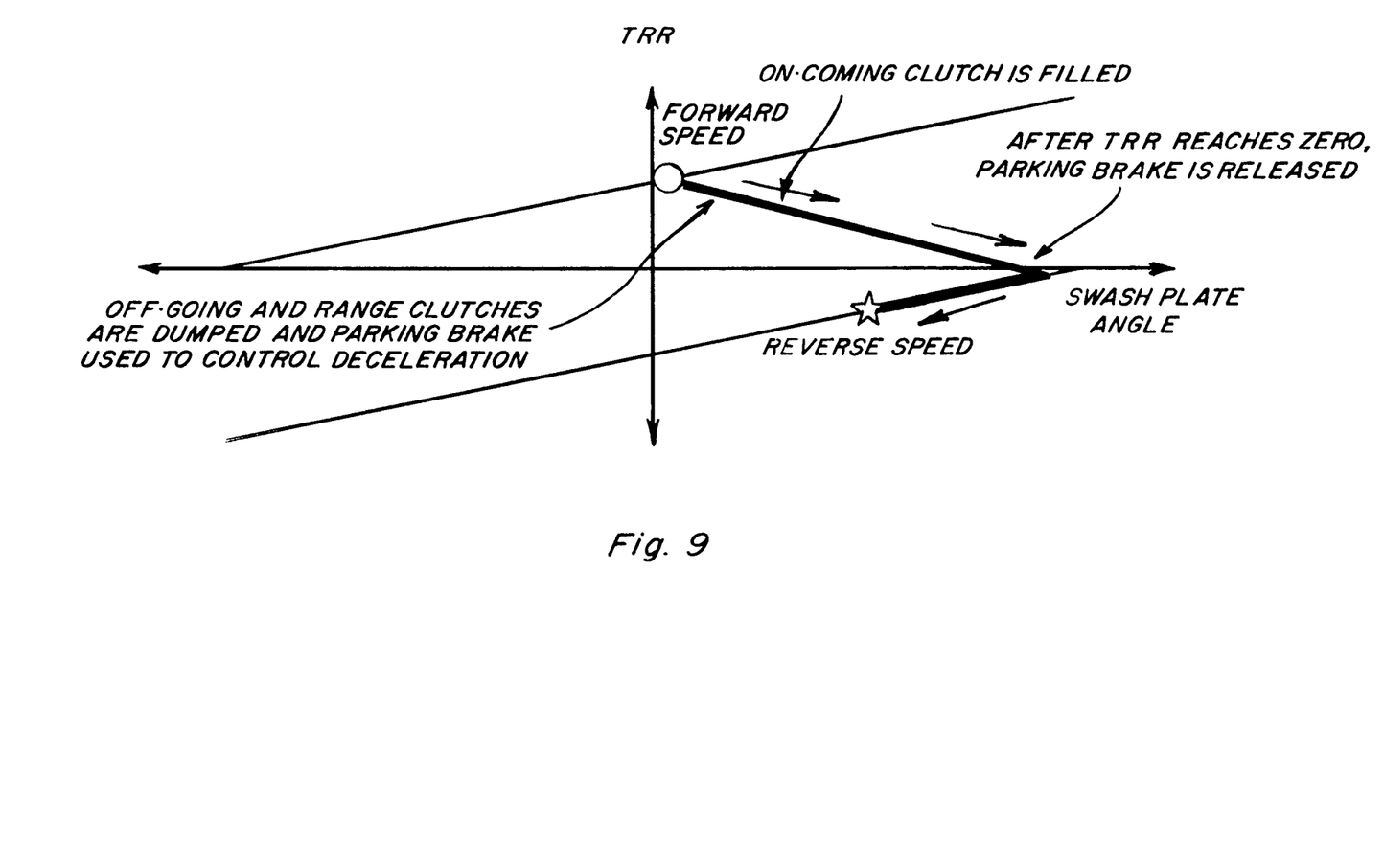
FIG. 9 is a simplified diagrammatic representation of the transmission ratio verses swash plate angle for the transmission of FIG. 2, for still another selectable manner of shifting the transmission.

As illustrated in FIG. 7, when the shuttle shift using the parking brake to decelerate is initiated, there will be a slight delay as the parking brake is prepared to be applied (this cannot be done in advance, since there is no ratio changing before the swap). The off-going clutch is dumped, since the range swap must be performed, but the range clutch also must be dumped to decouple the planetary from the wheels and avoid any torque from moving the swash plate affecting the deceleration. The parking brake is then used to decelerate the vehicle while the swash plate is moved into position and the on-coming clutch is engaged. Engaging the on-coming clutch does not affect the output torque, since the range clutch remains disengaged. Generally, the swash plate is in position before zero speed is reached (since lower speed shuttles don't use this method), and the vehicle will not stop at zero, but this may not be the case if the swash plate movement is slower than normal. As soon as the swash plate is in position, the on-coming clutch is used to continue the deceleration to zero and reaccelerate in the opposite direction.

Shuttle shifts may also comprise combinations of the types described above, as illustrated in FIGS. 8 and 9. Shifts may use the parking brake to decelerate to zero, then use the ratio changing to reaccelerate, if the final speed needed is low. Similarly, if the initial speed is low, a shuttle shift may use ratio changing to slow the vehicle to zero, then engage the range clutch to take off to a higher speed. The exact speed at which the controller change approaches from the shuttle shift method using the parking brake to decelerate and the method using ratio control is determined by tuning or experimentation, and as the shuttle shifts using the parking brake to decelerate are improved (perhaps through faster swash plate movement), the speed may be lowered. At some point, the ratio changing is smoother than deceleration with the parking brake. Generally it is not as smooth to let the vehicle actually come to a stop with the shuttle shift method using the parking brake to decelerate.

If the directional clutches, range clutches or parking brake are too hot, e.g., according to a sensed temperature value or values, or an estimate of the temperature based on the history of clutch pressures and worst case assumptions on the clutches, then controller 100 can inhibit the shuttle logic directional swap, and use ratio changing to bring the vehicle to a stop. If the ratio changing is not effective, there will not be a timeout, the system will continue to wait for the vehicle to slow down, then complete the shuttle.

If the directional swap is in progress and the clutches become too hot (perhaps more typical than starting hot), then a "reverting" logic is used. This includes setting the desired transmission ratio to the current transmission ratio, so the swash plate will be moved to what is needed for re-engaging. Note that the clutches are simply re-engaged and the direction swap is over, regardless of the transmission ratio, or hydrostatic power system ratio. The swash plate will then be moved to reduce the transmission ratio to zero, and then the angle reversed, and then positioned for the target speed in the new direction.

It should be noted that if an operator commands a shuttle shift, and the vehicle does not slow down fast enough, or does not slow at all, such as when pulling a trailer down a hill, it is advisable and normal for the operator to use the service brakes (typically brake pedals on the floor of the operator cab). The service brakes can always be used during shuttle shifts to increase deceleration.

Figure 10:
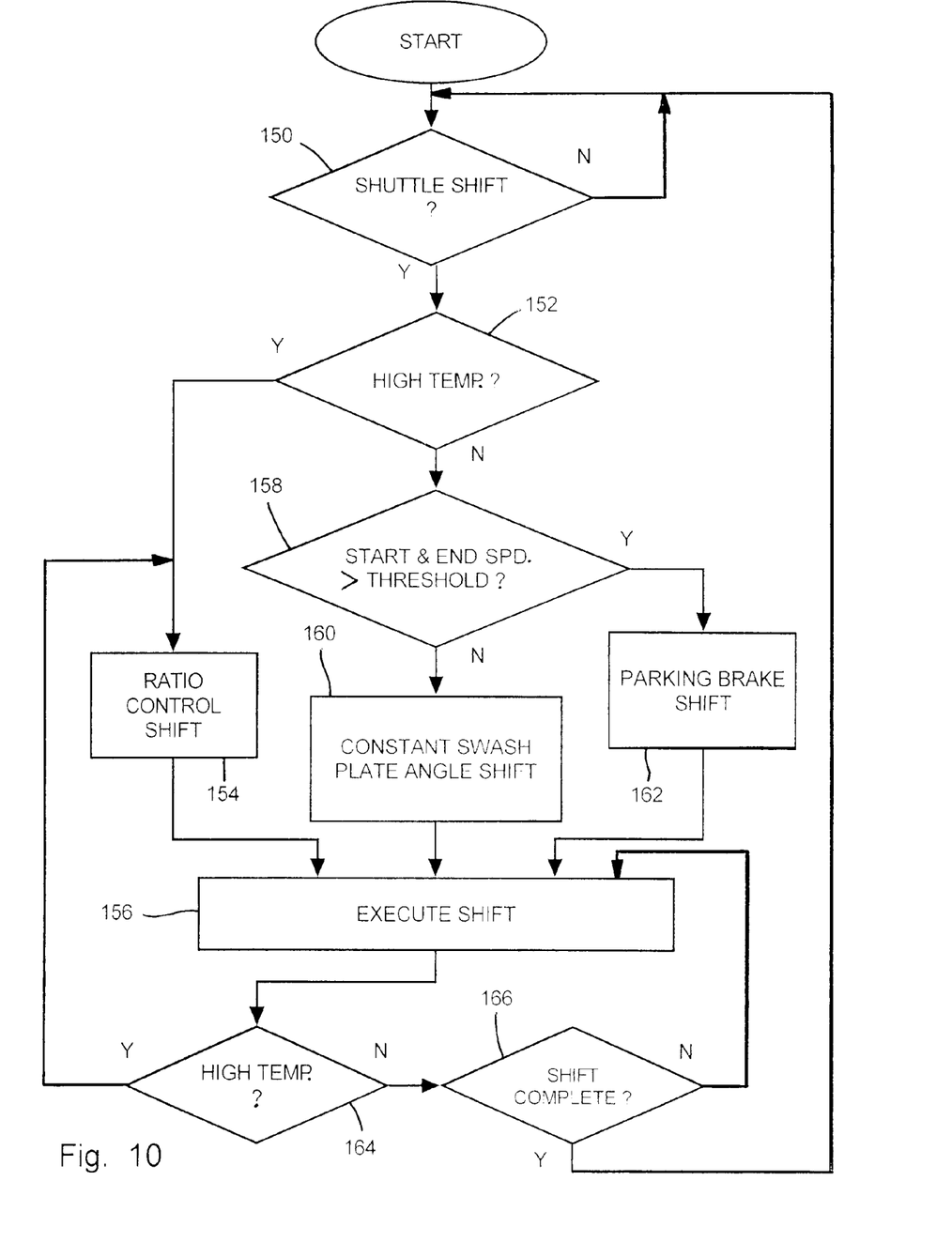
FIG. 10 is a high level flow diagram showing steps of a method of the invention for automatically selecting a manner of shuttle shifting according to the invention.

Referring also to FIG. 10, a high level flow diagram of steps of a method of the invention for controlling shuttle shifts is shown. In the diagram, once the commands for a shuttle shift are received, as denoted in block 150, it is determined whether a high temperature condition exists in the parking brake or clutches, as denoted at block 152. If yes, a ratio controlled shift is selected, as denoted at block 154, and the shift is executed, as denoted at block 156. If at block 152 no high temperature condition is present, it will be determined if at least one of the start and end speeds are greater than thresholds, a high to high, high to low, or low to high speed shift, as denoted at block 158. If yes, a constant SPA shuttle shift is utilized, as illustrated in FIGS. 5 and 6, and denoted at block 160, and the shift executed. If at block 158 at least one of the speeds is not above the threshold values, a shuttle shift using the parking brake to decelerate will be utilized, as denoted at block 162 and illustrated in FIGS. 4 and 7, and the shift executed as denoted at block 156. This can be a shuttle shift using ratio control or a shuttle shift using the parking brake to decelerate. If, during execution of the shift, a high temperature condition is detected, as denoted at decision block 164, the shift in process will be converted to a ratio control shift (if not already that type), as denoted at block 154, execution will proceed in that manner. When the shift is complete, the logic will return to block 150, as denoted by decision block 166.

It will be understood that the foregoing descriptions are for preferred embodiments of this invention and that the invention is not limited to the specific forms shown. Other modifications may be made in the design and arrangement of other elements without departing from the scope of the invention as expressed in the appended claims.

What is claimed is:

1. A method of automatically operating a continuously variable hydro-mechanical transmission of a vehicle responsive to a commanded shuttle shift, comprising steps of:
   determining a start speed of operation of the transmission and a commanded end speed thereof for the shuttle shift; and
   a. if the start speed and the end speed are greater than predetermined first threshold values therefor, then performing the shuttle shift by changing a direction of operation of the transmission while holding a swash plate of a hydrostatic power unit of the transmission tilted in one direction.

2. The method of claim 1, comprising an additional step of:
   b. if the start speed and the end speed are both below the predetermined threshold values therefor, respectively, then performing the shuttle shift by changing the direction of operation of the transmission and the direction of tilt of the swash plate while holding the vehicle at least substantially stationary.

3. The method of claim 2, wherein at least one of the steps of performing the shuttle shift comprises decelerating vehicle during at least a portion of the shift, and prior to or during the shuttle shift a step will be performed including determining whether a temperature of a first element will or does exceed a predetermined threshold value therefor, and:
   i. if no, then performing the shuttle shift using the first element for the deceleration; and
   ii. if yes, then performing the shuttle shift in a different manner without using the first element for the deceleration.

4. The method of claim 3, wherein the step of determining whether the temperature of the first element will exceed the threshold value comprises modeling the temperature as a function of at least a history of usage of the first element.

5. The method of claim 3, wherein the first element comprises a parking brake of the vehicle, and the second element comprises at least one clutch of the transmission.

6. The method of claim 3, wherein the first element comprises at least one clutch of the transmission and the second element comprises a parking brake of the vehicle.

7. The method of claim 3, wherein the step of determining whether the temperature of the predetermined first element will exceed the threshold value comprises modeling the temperature as a function of at least one variable.

8. The method of claim 1, wherein if the start speed is greater than a predetermined value, then the speed of the vehicle will be decreased prior to performing step a.

9. The method of claim 1, wherein the step of changing the direction of operation of the transmission comprises a sequence of disengaging a first directional clutch and engaging a second directional clutch.

10. A method of automatically operating a continuously variable hydro-mechanical transmission of a vehicle, comprising steps of:
    monitoring an operator controlled input device for inputted commands indicative of a commanded shuttle shift; then
    determining a start speed of the shift and an end speed of the shift, and, selecting a manner of performing the shuttle shift at least partially as a function of the speeds; wherein
    a. if the speeds are above threshold values therefor, respectively, then initiating the shuttle shift while still moving by reversing a direction of operation of an input of the transmission while maintaining a displacement and a direction of operation of a hydrostatic power unit thereof substantially constant; or
    b. if at least one of the start speed and the end speed are below the threshold value therefor, then changing the displacement of the hydrostatic power unit to slow the speed of the vehicle to about zero, reversing the direction of operation of the hydrostatic power unit and changing the displacement thereof to achieve the end speed.

11. The method of claim 10, wherein at least one of the shuttle shift steps will include decelerating the vehicle during at least a portion thereof using a predetermined first element, and wherein the method includes a step prior to step a. of determining whether a temperature of the first element will exceed a predetermined threshold value therefor, and:
    i. if no, then performing the shuttle shift using the first element for the deceration; and
    ii. if yes, then performing the shuttle shift using a second element for the deceleration.

12. The method of claim 11, wherein the step of determining whether the temperature of the first element will exceed the threshold value comprises modeling the temperature as a function of at least a history of usage of the first element.

13. The method of claim 11, wherein the first element comprises a parking brake of the vehicle, and the second element comprises at least one clutch of the transmission.

14. The method of claim 11, wherein the first element comprises at least one clutch of the transmission and the second element comprises a parking brake of the vehicle.

15. The method of claim 11, wherein the step of determining whether the temperature of the predetermined first element will exceed the threshold value comprises modeling the temperature as a function of at least one variable.

16. The method of claim 15, wherein the at least one variable comprises a history of use of the first element.

17. The method of claim 10, wherein the step of changing the direction of operation of the transmission comprises a sequence of disengaging a first directional clutch and engaging a second directional clutch.

18. A method of automatically operating a continuously variable hydro-mechanical transmission of a vehicle, comprising steps of:
    monitoring an operator controlled input device for inputted commands indicative of a commanded shuttle shift;
    determining a start speed of the shift and an end speed of the shift;
    modeling a temperature of at least a first element configured and operable for holding or decelerating the vehicle during the shuttle shift; and
    selecting a manner of performing the shuttle shift by either changing a direction of operation of the transmission while holding a displacement of a hydrostatic power unit thereof substantially constant, or by reducing the speed to about zero and holding the vehicle while changing the direction of operation and a direction of the displacement, as a function of an analysis of the start and end speeds and the modeled temperature.

19. The method of claim 18, wherein the first element comprises a parking brake of the vehicle, the analysis comprises determining if the modeled temperature is above a threshold, and if yes, then holding the vehicle during the shuttle shift using an element other than the parking brake.

20. The method of claim 18, comprising an additional step of modeling a temperature of a second element configured and operable for holding the vehicle during the shuttle shift; and wherein the step of selecting the manner of performing the shuttle shift additionally includes analyzing the modeled temperature of the second element.

21. The method of claim 20, wherein the second element comprises at least one range clutch of the transmission.

\* \* \* \* \*